United States Patent
Yamamoto et al.

(10) Patent No.: US 9,239,129 B2
(45) Date of Patent: Jan. 19, 2016

(54) HOLDING FORCE ADJUSTING APPARATUS

(71) Applicant: FUMOTO GIKEN CO., LTD., Miura-gun, Kanagawa-ken (JP)

(72) Inventors: Ryouhei Yamamoto, Miura-gun (JP); Yuho Yamamoto, Miura-gun (JP); Naoyuki Yamamoto, Miura-gun (JP)

(73) Assignee: FUMOTO GIKEN CO., LTD., Miura-gun (JP)

( * ) Notice: Subject to any disclaimer, the term of this patent is extended or adjusted under 35 U.S.C. 154(b) by 89 days.

(21) Appl. No.: 13/941,158

(22) Filed: Jul. 12, 2013

(65) Prior Publication Data

US 2014/0014805 A1    Jan. 16, 2014

(30) Foreign Application Priority Data

Jul. 13, 2012   (JP) ................................. 2012-158168
Nov. 9, 2012   (JP) ................................. 2012-247949

(51) Int. Cl.
*G01M 1/00*     (2006.01)
*F16M 13/00*    (2006.01)
*G01M 1/12*     (2006.01)
*A47C 31/12*    (2006.01)
*A47C 1/032*    (2006.01)

(52) U.S. Cl.
CPC ............ *F16M 13/00* (2013.01); *A47C 1/03255* (2013.01); *A47C 1/03266* (2013.01); *A47C 1/03272* (2013.01); *A47C 1/03294* (2013.01); *A47C 31/126* (2013.01); *G01M 1/12* (2013.01)

(58) Field of Classification Search
CPC ........ A47C 9/002; B60N 2/544; B60N 2/505; G01M 1/12; G01M 1/22
USPC ........ 297/314, 338, 361.1, 304; 73/65.01, 66, 73/172
See application file for complete search history.

(56) References Cited

U.S. PATENT DOCUMENTS 4,830,432 A * 5/1989 Fuhrmann ............ A47C 31/126
                                                                267/131
5,577,803 A * 11/1996 Guilbaud ............. A47C 1/0244
                                                                248/396
5,769,492 A * 6/1998 Jensen ................... A47C 9/002
                                                                297/188.09

(Continued)

FOREIGN PATENT DOCUMENTS

DE        40 07 179 A1    9/1991
JP        02-71347 U      5/1990

(Continued)

*Primary Examiner* — Lisa Caputo
*Assistant Examiner* — Nigel Plumb
(74) *Attorney, Agent, or Firm* — Masuvalley & Partners

(57) ABSTRACT

A holding force adjusting apparatus to be attached to a posture holding apparatus having a base, a supporting member which is attached onto the base so that the supporting member freely swings between a standby state where the supporting member does not support a substance on the base and an active state where the supporting member supports the substance in an inclination state, and a swinging support member having a biasing force for returning the supporting member to the standby state when the supporting member is inclined, the holding force adjusting apparatus being designed to adjust a biasing force of the swinging support member, the holding force adjusting apparatus including a weighting detection member for detecting weight of the substance to be placed, and a returning force adjusting member for adjusting the bias force according to a detected weight by the weight detecting means.

8 Claims, 12 Drawing Sheets

(56) References Cited

U.S. PATENT DOCUMENTS

| | | | |
|---|---|---|---|
| 7,198,329 B1 * | 4/2007 | Larson | A47C 3/22 248/157 |
| 8,029,060 B2 * | 10/2011 | Parker | A47C 1/023 297/300.1 |
| 2007/0170762 A1 | 7/2007 | Erker | |

FOREIGN PATENT DOCUMENTS

| | | |
|---|---|---|
| JP | 1991-122740 U | 12/1991 |
| JP | 2006-181101 A | 7/2006 |
| JP | 3136349 U | 10/2007 |
| JP | 2009-082529 A | 4/2009 |

\* cited by examiner

HOLDING FORCE ADJUSTING APPARATUS

This application claims priority under 35 U.S.C. §119 from Japanese patent application Serial No. 2012-158168, filed Jul. 13, 2012 and Japanese patent application Serial No. 2012-247949, filed Nov. 9, 2012, which are incorporated herein by reference in its entirety.

TECHNICAL FIELD

The present invention relates to a holding force adjusting apparatus used in a posture holding apparatus for maintaining the posture by holding a substance placed on a base from the sides.

BACKGROUND ART

Conventionally, when transporting baggage or the like by loading them on board, or when placed objects are loaded and transported, or stored etc, the transported goods or the stored goods are placed on a pedestal or in a container as mentioned in the Patent document 1, for example.

PRIOR ART DOCUMENTS

Patent Documents

Patent document 1: Utility model registration No. 3136349
Patent document 2: Japanese Unexamined Patent Publication No. 2006-181101

Problem To Be Solved By The Invention

However, some objects placed on such pedestals or the like shift the center of gravity while in the mounted state. For example, in case of animals or humans, the center of gravity changes every time they change their postures, and therefore, it is not possible to hold them stably at all times on the pedestal. Further, in case of water tank or the like, every time waves occur in water due to shaking or vibration during transportation, the center of gravity shifts.

In such cases, in order to prevent objects from falling off the pedestal due to the shifting of the center of gravity, a supporting member is disposed in the circumference of the pedestal for supporting the fallen object. Conventionally, such supporting members have configurations such as a railing or a frame disposed in the circumference, or a configuration using an elastic member that deforms by absorbing the impact to avoid damage to the fallen object, and that gently pushes back the object according to the amount of deformation.

However, the structure of the conventional supporting members had a drawback that is when the weight of the placed object is increased, the restoration force of the elastic members becomes inadequate, and the holding force for maintaining the placed object in an expected posture becomes insufficient, so that satisfactory posture-maintaining effect was not achieved. On the other hand, if the restoring force of the elastic member is enhanced in order to improve the holding power of placed heavy objects, there was a drawback that when a lightweight object is inclined on the supporting member, the impact absorbing effect was not satisfactory manifested since the elastic member was unable to deform sufficiently.

SUMMARY OF INVENTION

An object of the present invention is to provide a holding force adjusting apparatus in which sufficient impact absorbing effect can be maintained for an object with a wide range of weight from light weight to heavy weight, and a posture-retaining effect to restore to original posture can be also manifested in an apparatus for holding the posture of a placed object.

An embodiment of the present invention has the following configuration for solving the problems mentioned above.

(1) A holding force adjusting apparatus to be attached to a posture holding apparatus having
   a base onto which a substance to be placed,
   a supporting member which is attached onto the base so that the supporting member freely swings between a standby state where the supporting member does not support the substance and an active state where the supporting member supports the substance in an inclination state, the supporting member being positioned on a side of the base, and
   a swinging support having a biasing force for returning the supporting member to the standby state when the supporting member is inclined, the holding force adjusting apparatus being designed to adjust a biasing force of the swinging support member, the holding force adjusting apparatus including,
   a weighting detection member for detecting weight of the substance to be placed; and
     a returning force adjusting member for adjusting the bias force according to a detected weight by the weight detecting means.

(2) A holding force adjusting apparatus to be attached to a posture holding apparatus having
   a base onto which a substance to be placed,
   a supporting member which is attached onto the base so that the supporting member freely swings between a standby state where the supporting member does not support the substance and an active state where the supporting member supports the substance in an inclination state, the supporting member being positioned on a side of the base, and
   a swinging support member having a biasing force for returning the supporting member to the standby state when the supporting member is inclined, the holding force adjusting apparatus being designed to adjust a biasing force of the swinging support member, the holding force adjusting apparatus including:
   a liquid pressure output member for outputting liquid pressure in response to a weight of the substance placed on the base, the liquid pressure output member being positioned under the base;
   an elastic member for giving bias force to the swinging support member in response to an amount of inclination of the supporting member;
   a bias force adjustment member for adjusting a bias force from the elastic member according to a liquid pressure outputted from the liquid pressure output member.

(3) The holding force adjusting apparatus of the above-mentioned (2), wherein the liquid pressure output member is configured such that liquid pressure is outputted by shrinking a capacity of a storage room for storing liquid according to a weight of the substance to be placed onto the base.

(4) The holding force adjusting apparatus of the above-mentioned (2) or (3) further including:
   an adjusting member designed to adjust a displacement amount of the elastic member in the standby state,
   wherein the bias force adjusting member moves the adjusting member back and forth according to a liquid pressure outputted from the liquid pressure output member to adjust the displacement amount of the elastic member in the standby state.

(5) The holding force adjusting apparatus of any one of (2) to (4) further including:

a pressure transmitting member for transmitting the liquid pressure from the liquid pressure outputting member to the bias force adjusting member; and a disabling reverse transmission member for disabling transmission of liquid pressure in a direction from the bias force adjusting member to the liquid pressure outputting member and enabling transmission of liquid pressure in a direction from the liquid pressure outputting member to the bias force adjusting member using a pressure transmission medium, the disabling reverse transmission member being provided in the pressure transmission member.

(6) The holding force adjusting apparatus of the above-mentioned (5), further including:

a release member for releasing regulations of a pressure transmission direction of the disabling reverse transmission member when the supporting member returns to the standby state.

Effect Of The Invention

According to an embodiment of the invention (1), the returning force of the supporting member provided for maintaining the posture of a placed object can be adjusted according to the weight of the placed object. Accordingly, it is possible to achieve sufficient posture-holding force for a wide range of weights from light weight to heavy weight while maintaining a shock absorbing action that is appropriate according to the load, without need to separately provide a means for adjusting the holding force.

According to an embodiment of the invention (2), it is possible to adjust the biasing force in accordance with the weight of the placed object while acting the biasing force of the elastic member against the supporting member provided for maintaining the posture of the object as a returning force according to a degree of inclination of the supporting member. Accordingly, it is possible to achieve sufficient posture-holding force for a wide range of weights from light weight to heavy weight while maintaining a shock absorbing effect that is appropriate according to the load without need to separately provide a means for adjusting the holding force. Moreover, because the disabling reverse transmission member prevents counter flow of pressure transmission medium caused by the reactive force of the biasing force acting on the supporting member by the elastic member, the holding force can be surely adjusted in accordance with the degree of inclination of the supporting member.

According to an embodiment of the invention (3), the liquid pressure output member is configured such that liquid pressure is output by shrinking the volume of the storage room by weight, and therefore, the weight of the placed object can be converted to liquid pressure with certainty.

According to an embodiment of the invention (4), a displacement amount of the elastic member in the standby state can be determined by moving the adjusting member back and forth, and therefore, the posture holding force based on the biasing force from the elastic member can be adjusted in accordance with weight as appropriate by adjusting the displacement amount.

According to an embodiment of the invention (5), because the disabling reverse transmission member prevents counter flow of pressure transmission medium caused by the reactive force of the biasing force acting on the supporting member by the elastic member, the holding force can surely be adjusted in accordance with the degree of inclination of the supporting member.

According to an embodiment of the invention (6), when the supporting member is returned to the standby state, the restriction of the pressure transmission direction by the disabling reverse transmission member is released, and therefore, even if the weight of the placed object changes, the biasing force can be adjusted according to the weight change.

DETAILED DESCRIPTION OF PREFERRED EMBODIMENTS

Figure 1:
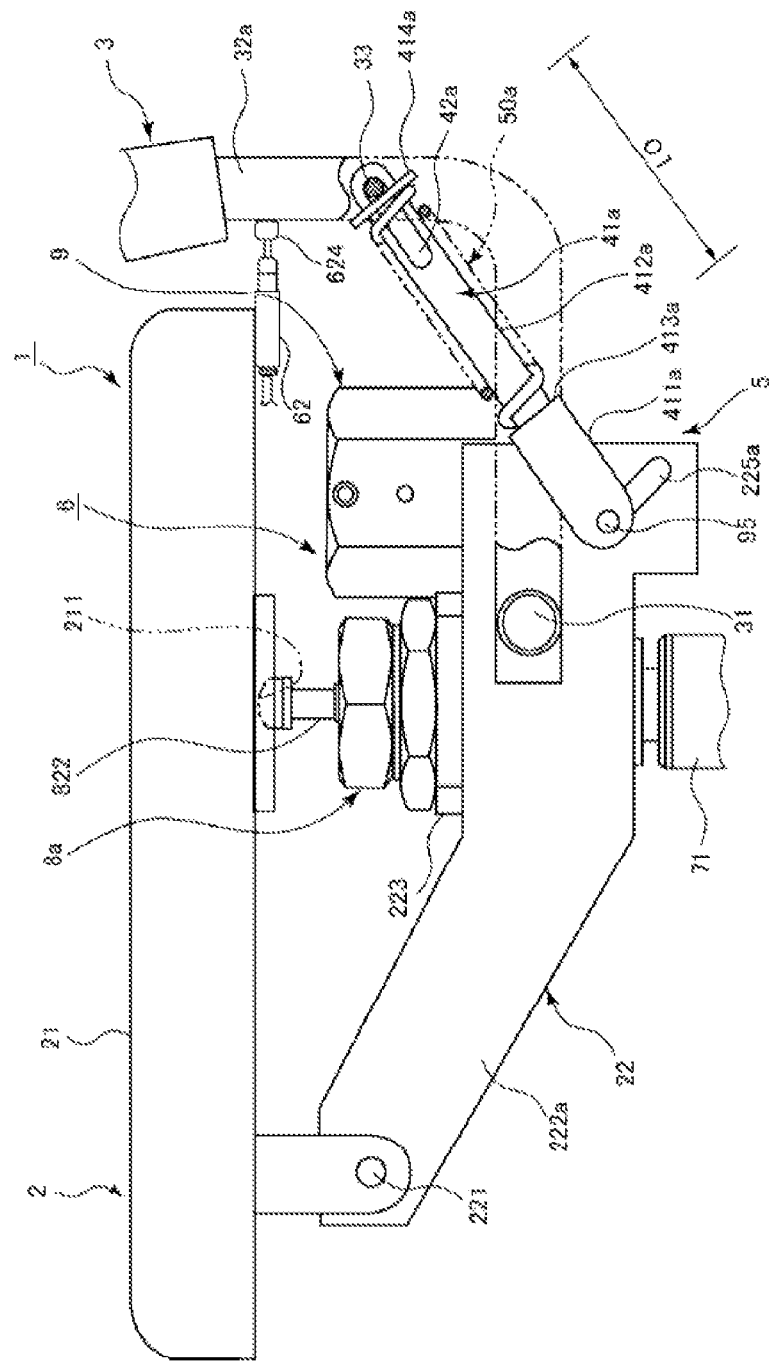
FIG. 1 is a side view of the holding force adjusting apparatus of the present invention in standby state of the initial state.
Figure 2:
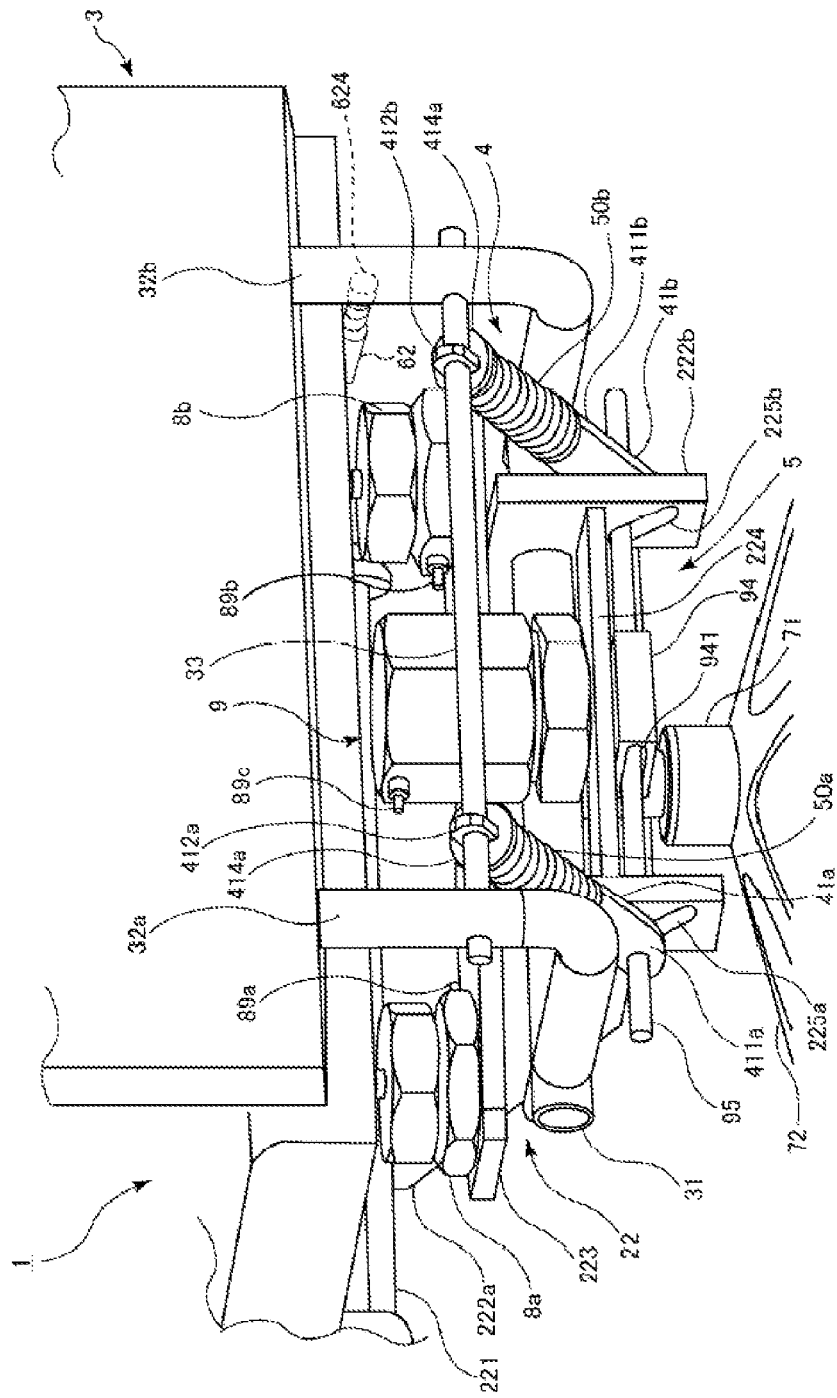
FIG. 2 is a perspective view of the holding force adjusting apparatus of the present invention in standby state of the initial state.

A preferred embodiment of the present invention will be explained in detail below with reference to the accompanying figures. FIG. 1 is a side view and FIG. 2 is a perspective view of a posture holding apparatus 1 that holds a placed object employed in the holding force adjusting apparatus of the present invention.

The posture holding apparatus 1 that holds a placed object is provided with a base 2, a supporting member 3 disposed on a side of the base 2, a swinging support member 4 that freely swings to support the supporting member 3 with respect to the base 2, springs 50a and 50b as elastic members for biasing the supporting member 3 towards an object placed on the base 2, a bias force adjust member 5 for adjusting the biasing force obtained from the springs 50a and 50b, a pressure actuator 8 as a liquid pressure output member to change the liquid pressure caused by the load of the object placed on the base 2, and a movement amount actuator 9 that converts the output liquid pressure to reciprocating quantity.

The base 2 is structured by a mounting platform 21 on which an object will be placed, and a substrate 22 disposed on the lower side of the mounting platform 21. The substrate 22 and the base 2 are connected by a hinge 221 disposed near one end of the base 2 such that they can swing freely.

Figure 12:
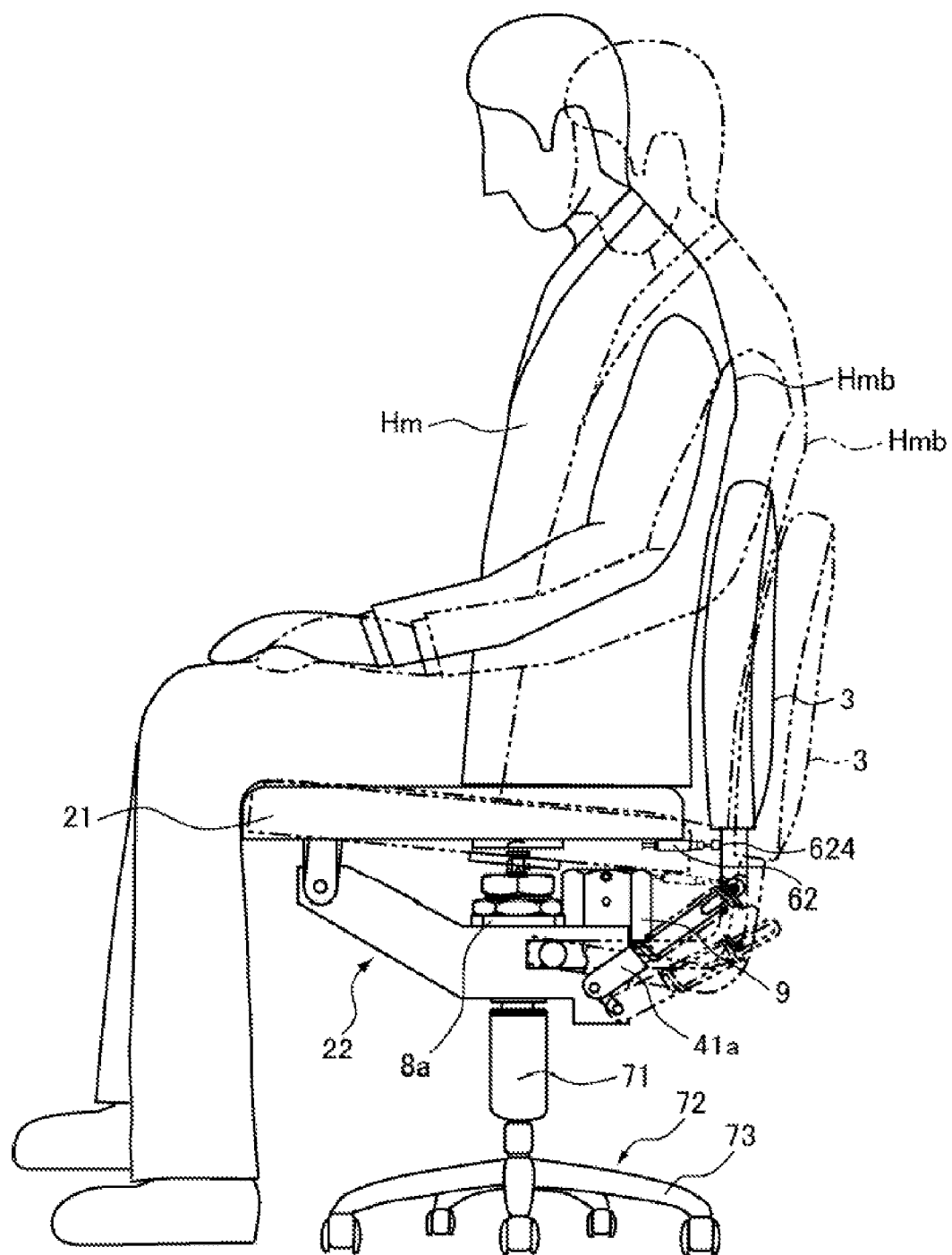
FIG. 12 is a side view showing an example of actual operating condition of the holding force adjusting apparatus of the present invention.

The substrate 22 is provided with a pair of side members 222a and 222b that are placed in parallel with each other, a substrate 223 constructed between the side members 222a and 222b, and beam 224. The side members 222a and 222b are of the same shape, in which the pin shaft of the hinge 221 is inserted in the end, and the substrate 223 and beam 224 are disposed in sequence towards the base end section. The lower side of the substrate 223 is connected to the tip of a strut 71 and the base end of the strut 71 is connected to the pedestal 72. The pedestal 72 can have any configuration, and for example, as shown in FIG. 12, it may be configured of a plurality of legs 73 disposed radially from the base end of the strut 71, and casters 74 provided at the tip of the legs 73.

The strut 71 is rotatably connected to the substrate 223. Further, strut 71 may be configured such that adjustment mechanism enabling adjustment to any length is included, and the height of mounting platform 21 can be varied.

The substrate 223, when an object is placed on the mounting platform 21, is located on the vertical line passing through the center of gravity of the placed object, or is located in a position that is closer to the hinge 221 than the said vertical line. The base end of side members 222a and 222b is provided with long holes 225a and 225b respectively as distance adjusting members. In the vicinity of the substrate 223, an oscillating shaft 31 of the supporting member 3 is inserted between the side members 222a and 222b in a freely-rotatable manner, and the supporting member 3 is supported to the base 2 by this oscillating shaft 31 such that it can swing freely.

Both ends of the oscillating shaft 31 are connected to one end of the swing members 32a and 32b that are bent in an L-shape, and a supporting member 3 is connected to the other end of each of the swing members 32a and 32b. The supporting member 3 is located along a side of the object placed on the mounting platform 21, and when the object placed on the mounting platform 21 leans towards the supporting member 3, a push back action so as restore the placed object to the original state (posture) will manifest. In such a configuration as above, a supporting member 3 swings between the standby state before the inclination (the state in FIG. 1 and FIG. 8) and the working state in which the placed object is inclined towards the supporting member 3 (the state in FIG. 9, and FIG. 11).

A connecting member 33 that bridges between the oscillating members 32a and 32b is provided near the other end of the swing members 32a and 32b, and the both ends of the connecting member 33 are connected with connecting members 41a and 41b respectively.

A movement member 95 is connected at the base ends of the connecting members 41a and 41b as adjustment member such that it can swing freely. At the tip of the connecting members 41a and 41b, long holes 42a and 42b are formed respectively (the long hole of the connecting member 41b is not shown), and a connecting member 33 is inserted inside each of the long holes 42a and 42b.

On the other hand, the long holes 225a and 225b formed in the side members 222a and 222b are formed inclined with respect to the seat surface of the mounting platform 21, and are provided so as to position below the oscillating shaft 31 and also in the lower side of the connecting member 33 at all times. Further, the long holes 225a and 225b are formed in a direction such that the distance between the moving member 95 and connecting member 33 will change by the movement of the moving member 95 in the long holes 225a and 225b. In this embodiment, when the supporting member 3 is in a standby state and when the moving member 95 is positioned in the upper end, the moving member 95 and the connecting member 33 are in the farthest position from each other, and when positioned at the lower end, they will be in a state of closest approach.

By sliding the connecting member 33 in the long holes 42a and 42b, the actual length of the connecting members 41a and 41b can be changed based on the change in the distance between the moving member 95 and the connecting member 33.

As the connecting members 41a and 41b have the same structure, the configuration of the connecting member 41a will be described below, and the numbers for some parts of the connecting member 41b will be omitted. The connecting member 41a is comprised of a wide base end part 411a and a tip 412a that is configured to be narrower than the base end part 411a. A spring 50a as an elastic member is mounted in compressed state on the exterior of the tip 412a. One end face of the spring 50a abuts a spring receiving part 414a interposed between the connecting member 33, while the other end face of the spring 50a abuts the stepped portion 413a between base end section 411a and tip 412a. In such a configuration, springs 50a and 50b are biased towards the direction in which the connecting member 33 is pushed up at all times, and as a result, the biasing force (restoring force) is being applied in the direction of returning the supporting member 3 to the standby state. The above-mentioned connecting members 41a and 41b, and springs 50a and 50b constitute the swinging support member 4.

Figure 3:
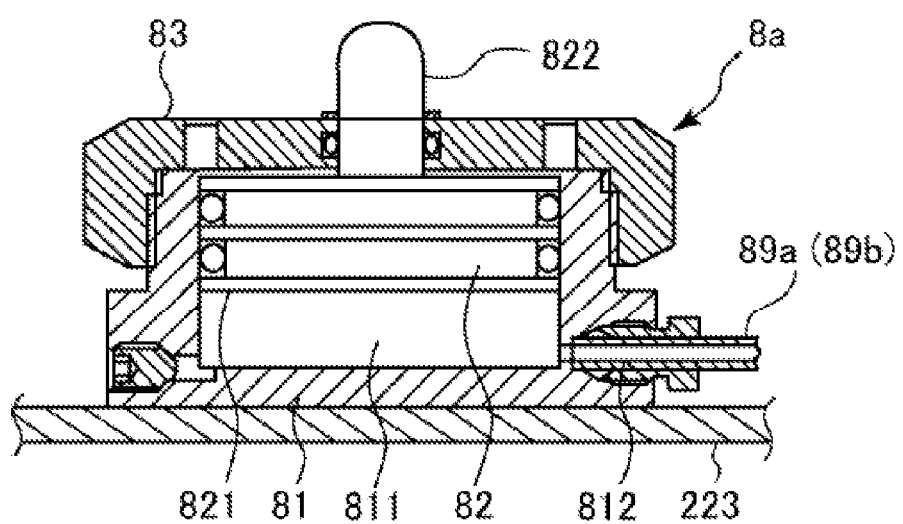
FIG. 3 is a cross-sectional rear view of pressure actuator.

Two pressure actuators 8a and 8b are disposed on substrate 223. FIG. 3 is a side cross-sectional view of the pressure actuator 8a. Since both of the pressure actuators 8a and 8b have the same configuration, the pressure actuator 8a will be explained, whereas the explanation of the pressure actuator 8b will be omitted.

The pressure actuator 8a is a mechanism to output the input movement amount as liquid pressure, and the pressure actuator 8a acquires the weight of the placed object loaded on the mounting platform 21 as a movement amount of the piston rod and outputs it as the liquid pressure (oil pressure).

The configuration of the pressure actuator 8a is described below. The pressure actuator 8a is comprised of a cylinder 81 fixed on the base substrate 223, a piston 82 housed inside the cylinder 81 such that it can reciprocate freely, and a lid 83 for closing the opening of the cylinder 81. In the storage room 811 defined by cylinder 81 and piston head 821, oil is loaded as the pressure transmitting medium. When the piston head 821 moves in the cylinder 81, the volume of the storage room 811 changes, and along with this change, the oil in the storage room 811 flows out or in through opening 812 of the cylinder 81.

A piston rod 822 is connected to the piston head 821, and the piston rod 822 protrudes from the center of the lid 83 to outside. The tip of the piston rod 822 is of spherical shape, and abuts the lower surface of the mounting platform 21. In the mounting platform 21, a spherical recessed part 211 is formed in the abutting section of the piston rod 822, and is configured such that the contact angle of the piston rod 822 with respect to mounting table 21 can be freely changed.

Provided is a configuration wherein once an object is placed onto the mounting platform 21, the mounting platform 21 pushes in the piston rod 822, and the piston head 821 moves in the direction to reduce the volume of the storage room 811 and the oil is forced out through the opening 812. The number of pressure actuators 8a and 8b described above is not limited to two, and can be one, or three or more. In case of providing a plurality of pressure actuators, it is preferable to dispose them evenly with respect to the plane of the mounting platform 21.

The opening 812 is connected with one end of the flow path 89a. The other end of the flow path 89a is connected to a disabling reverse transmission member 6 (described later), and the pressure output from the pressure actuator 8a is eventually fed to the cylinder chamber (pressure receiving chamber) 911 of the movement amount actuator 9. Moreover, similarly, oil pressure from the pressure actuator 8b is also fed to the cylinder chamber 91 of the movement amount actuator 9. If there are multiple pressure actuators 8, the liquid pressure output from all pressure actuators 8 is aggregated in the cylinder chamber 91 of the movement amount actuator 9. Further, the flow path 89a is configured of a flexible resinous tube, and the flow paths 89b to 89d (described later) are also configured of a flexible resinous tube.

Figure 4:
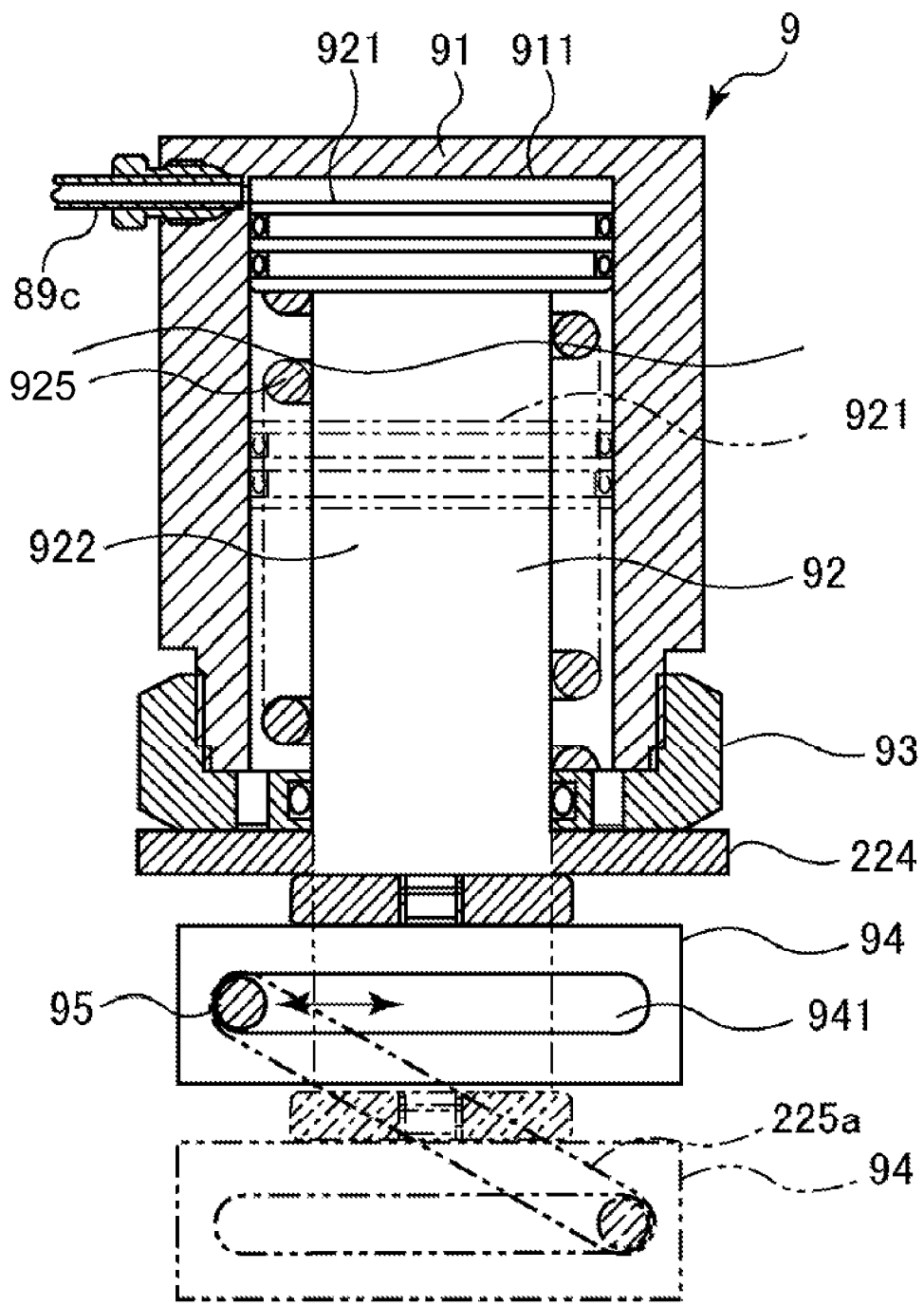
FIG. 4 is a cross-sectional side view of movement amount actuator.

Next, the configuration of the movement amount actuator 9 is described. FIG. 4 is a side cross-sectional view of the actuator 9. The movement amount actuator 9 is comprised of a cylinder 91, a piston 92 housed inside the cylinder 91, and a lid 93 to cover an opening of the cylinder 91. The lid 93 is fixed on the beam 224, and the piston rod 922 of piston 92 penetrates through the lid 93 and beam 224 and protrudes on the lower side of the beam 224.

The piston head 921 moves inside the cylinder 91, and a receiving chamber 911 is defined by the inner wall of the cylinder 91 and the piston head 921. Connected to the cylinder chamber 911 is one end of a flow path 89c where oil pressure from flow paths 89a and 89b merge. The pressure-receiving chamber 911 receives the oil pressure that is output from the pressure actuators 8a and 8b, and the pressure received by the receiving chamber 911 is converted to a movement amount of piston rod 922. In addition, a compression spring 925 is interposed between the piston head 921 and lid 93, and they bias the piston head 921 in the direction in which the volume of the pressure receiving chamber becomes none. Accordingly, when an object is not placed on the mounting platform 21, it is maintained in a state in which the volume of the pressure receiving chamber is zero, and the oil is pushed back towards the pressure actuators 8a and 8b.

A connection guide member 94 is provided at the tip of the piston rod 922, and this connection guide member 94 is provided with a long hole 941 as a guide section. A moving member 95 is inserted through the long hole 941. In such a configuration, when the piston rod 922 extends (downward), the connection guide member 94 moves (downward), and the moving member 95 inside the connection guide member 94 will also move (downward) simultaneously. The moving member 95 moves in the moving direction of the connection guide member 94, and it is guided by the long holes 225a and 225b to move in a direction that intersects the moving direction of the connection guide member 94 (the direction intersecting at right angles (horizontal direction)). The long hole 941 of the connection guide member 94 is intended for allowing a movement of the moving member 95 in the horizontal direction along with vertical movement (along with the back and forth movement of the piston rod 922, movement in a direction intersecting with this). The long holes 225a and 225b function as displacement amount adjusting parts for adjusting the length (displacement amount) of the springs 50a and 50b in standby state by adjusting the distance between the connecting member 33 of the moving member 95.

Figure 5:
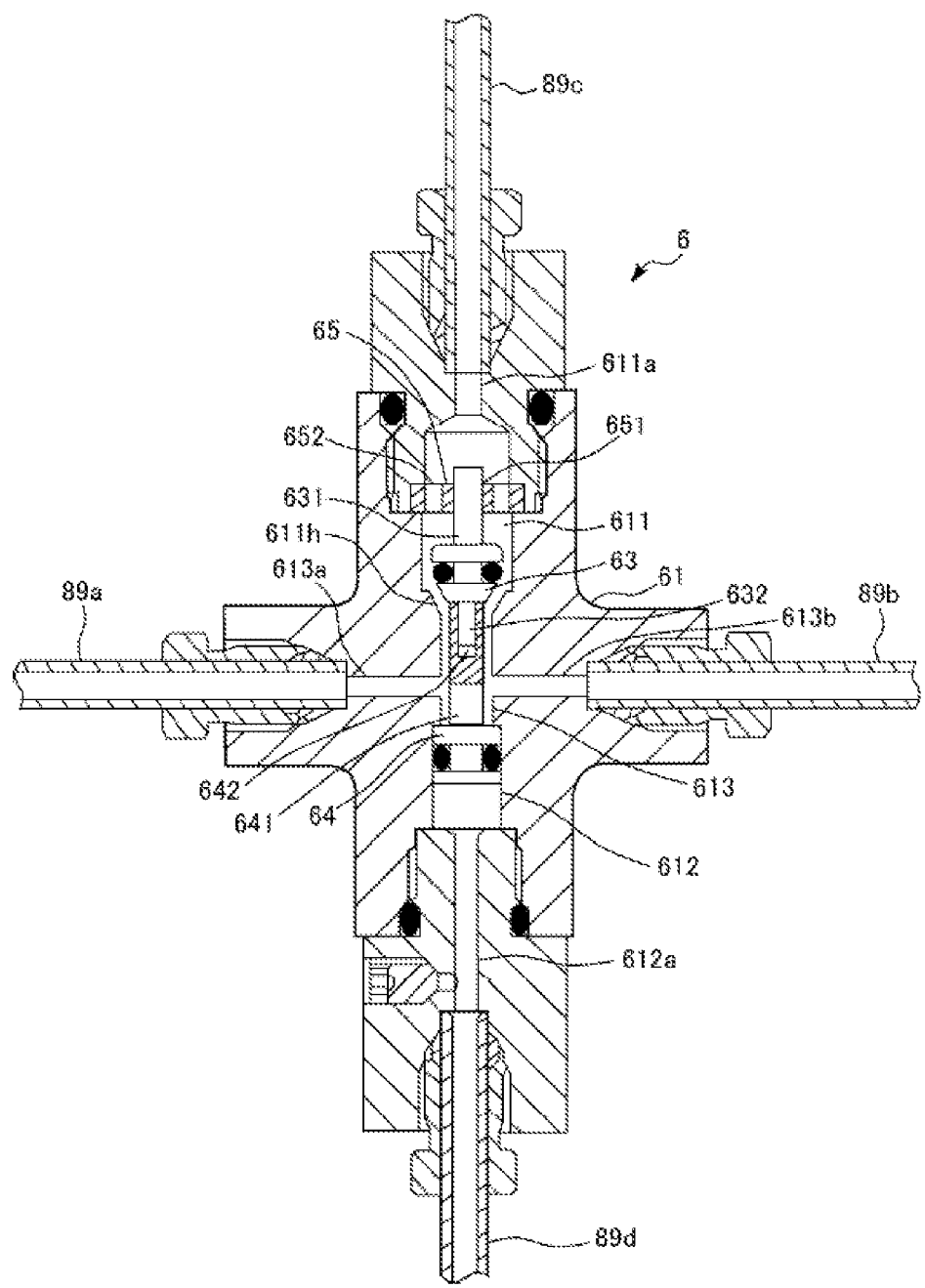
FIG. 5 is an overall cross-sectional side view of disabling reverse transmission member (released state).

In the flow path connecting the pressure actuators 8a and 8b and the movement amount actuator 9, a disabling reverse transmission member is provided to regulate the distribution of oil, which is the pressure transmitting medium. This disabling reverse transmission member allows the flow of liquid from pressure actuators 8a and 8b to the movement amount actuator 9, and regulates the flow from the movement amount actuator 9 to pressure actuators 8a and 8b as a rule. The disabling reverse transmission member 6 is described below with reference to FIG. 5. The disabling reverse transmission member 6 is a check valve that allows the flow of oil, which is the pressure transmission medium, in only one direction, and stops the flow in the reverse direction, and this check valve is provided with a release device for releasing the backflow restriction.

The check valve body 61 includes a valve chamber 611 that houses the valve body 63 in the inside, and an output side cylinder chamber 612. The output side cylinder chamber 612 and valve chamber 611 are connected through an interconnecting passage 613, and two flow paths 613a and 613b are connected to the interconnecting passage 613. The other end of the flow path 89a is connected to the flow passage 613a, while the other end of the flow path 89b is connected to the flow passage 613b. The output side cylinder chamber 612 is connected to the flow passage 612a, and the flow passage 612a is connected to one end of the flow path 89d. The valve chamber 611 is connected to the flow passage 611a, and the flow passage 611a is connected to the other end of the flow path 89c.

Inside the valve chamber 611, a valve body 63 and a disk-shaped guide member 65 are housed. In the valve body 63, the guide pins 631 and 632 are extended in the longitudinal direction along the axial direction (moving direction of the valve body, i.e. the flow direction of oil), whereas the rear end pin 631 is slidably inserted in the guide hole 651 formed in the center of the guide member 65. In the guide member 65, a plurality of flow-through holes 652 are formed around the guide hole 651.

The front end pin 632 of the valve body 63 is slidably inserted into the insertion hole 642 formed in the tip of the piston rod 641 of the output side piston 64 (described later). The valve body 63 is guided so as to reciprocate on the shaft line by the guide hole 651 and insertion hole 642.

A convex taper is formed on the outer peripheral portion of the valve body 63, and a sealing member is further provided in the exterior, which overlaps with the valve port 611h formed in the connecting part of valve chamber 63 and flow passage 613 to have the function of closing the valve port 611h. The valve port 611h has a configuration such that, since a recess taper having an inclination angle the same as the convex taper of the valve body 63 is formed, the valve body 63 opens for the flow towards the moving amount actuator 9 from pressure actuators 8a and 8b, and regarding the flow in the reverse direction, the valve body 63 closes by being pressed against the valve body 63 or the valve port 611h.

On the other hand, an output side piston 64 is housed in the output side cylinder chamber 612, and if the pressure inside the output side cylinder chamber 612 increases due to supply of the fluid from the flow passage 612a, the piston 64 moves in the direction of the valve body 63.

The output side cylinder chamber 612 is connected to an input side cylinder chamber 621 of the release member 60 through the flow path 89d.

Figure 6:
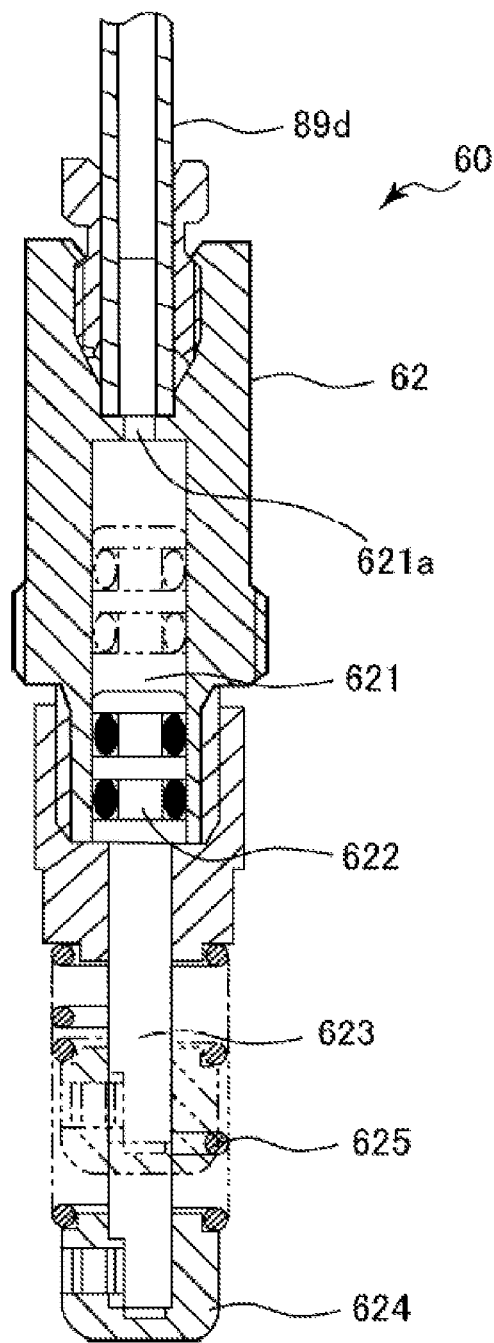
FIG. 6 is an overall cross-sectional side view of release member.

The configuration of the release member 60 is described below with reference to FIG. 6. The input side cylinder chamber 621 is provided inside the cylinder body 62, and an input side piston 622 is accommodated in the input side cylinder chamber 621. The input side cylinder chamber 621 is connected to the other end of the flow path 89d via the flow passage 621a. The piston rod 623 of the input side piston 622 protrudes from the input side cylinder chamber 621 and functions as a detection member, and a contact member 624 is provided at the tip of the piston rod 623. A compressed spring 625 is inserted between the contact member 624 and the tip of the cylinder body 62. The piston rod 623 is biased in the direction of protrusion by spring 625.

The cylinder body 62 is fixed to the lower rear end of the mounting platform 21, and is disposed so as to project the piston rod 623 in the rear direction. The contact member 624 is in contact with the swing member 32b.

The contact member 624 abuts the swing member 32b when in a standby state where the swing members 32a and 32b are not inclined, and in this state, the piston rod 623 is in a state of having been pushed into the cylinder body 62 to a maximum extent. In other words, when in the standby state, the inside volume of the cylinder 621 is the least. When the swing members 32a and 32b swing in the direction of inclination of the supporting member 3, the swing member 32b moves away from the cylinder body 62, and the piston rod 623 is drawn outwards by the spring 625. Further, the flow paths 89a to 89d constitute the pressure transmission member.

The relationship between the release member 60 and the disabling reverse transmission member 6 is explained below. When the piston rod 623 is drawn out by the action of the spring 625, and the input side piston 622 in the input side cylinder 621 moves in the direction of increasing the inner volume of the cylinder, oil is sucked up through the flow path 89d. With the sucking of the oil, the piston 64 in the output side cylinder chamber 612 of the check valve body 61 moves in a direction away from the valve body 63 (the state shown in FIG. 7). Since this releases the contact of the piston rod 641 with the valve body 63, the valve body 63 will be able to move in a direction to close the valve port 611h, and the flow of the oil from the movement amount actuator 9 towards pressure actuators 8a and 8b will stop.

On the other hand, when the swing member 32b returns to the standby position, the swing member 32b pushes the contact member 624 and in turn pushes the piston rod 623, and due to the movement of the input side piston 622, oil is pushed out of the input side cylinder chamber 621. With this, the piston 64 in the output side cylinder chamber 612 of the check valve body 61 moves towards the valve body 63, eventually presses the valve body 63, separates the valve body 63 from the valve port 611h, and releases the reverse-disabled state.

In this configuration, because fluid is employed as the pressure transmitting medium, by making the lateral cross-sectional area of the output side cylinder chamber 612 smaller than the lateral cross-sectional area of the input side cylinder chamber 621, the amount of movement of the output side piston 64 can be made larger than the amount of movement of the input side piston 622, and upon detecting the restoration of the swing member 32b to the standby position by the movement of the piston rod 623 of the input side piston 622, the valve body 63 is moved reliably, and the reverse-disabled state is released.

Apart from this, as a configuration of detecting the return of the swing members 32a and 32b as a movement amount by the release member 60, and outputting such detection result as movement amount in the release direction of the valve body 63, in addition to the use of liquid as described above, a wire or ring mechanism may also be employed.

The bias force adjust member 5 is comprised of movement amount actuator 9, connecting guide member 94, moving member 95, long holes 225a and 225b as a distance adjusting member, and connecting members 41a and 41b described above. Thereupon, the holding force adjusting apparatus is comprised of a liquid pressure output member, elastic member, bias force adjust member 5, and a disabling reverse transmission member.

The working of the posture holding apparatus 1 for holding an object placed of the present invention is described below with reference to FIG. 1, and FIG. 8 through FIG. 11. As shown in FIG. 1, when in a state wherein an object is not placed on the mounting platform 21 (initial state), oil has been returned to the pressure actuators 8a and 8b, the piston rod 822 is in the most protruded state, and the piston rod 922 of the movement amount actuator 9 is in the most retracted state. Accordingly, moving member 95 and connecting member 33 are in the farthest position from each other, and the supporting member 3 is in a standby state of the initial state. The biasing force in the return direction that is imparted to the supporting member 3 is also none or in the minimum state (state L0 wherein the spring 50a is most extended). Further, the contact member 624 of the release member 60 is in a state of the most pressed by the swing member 32b, and the valve body 63 of the disabling reverse transmission member 6 is away from the valve port 611h (released state).

Figure 8:
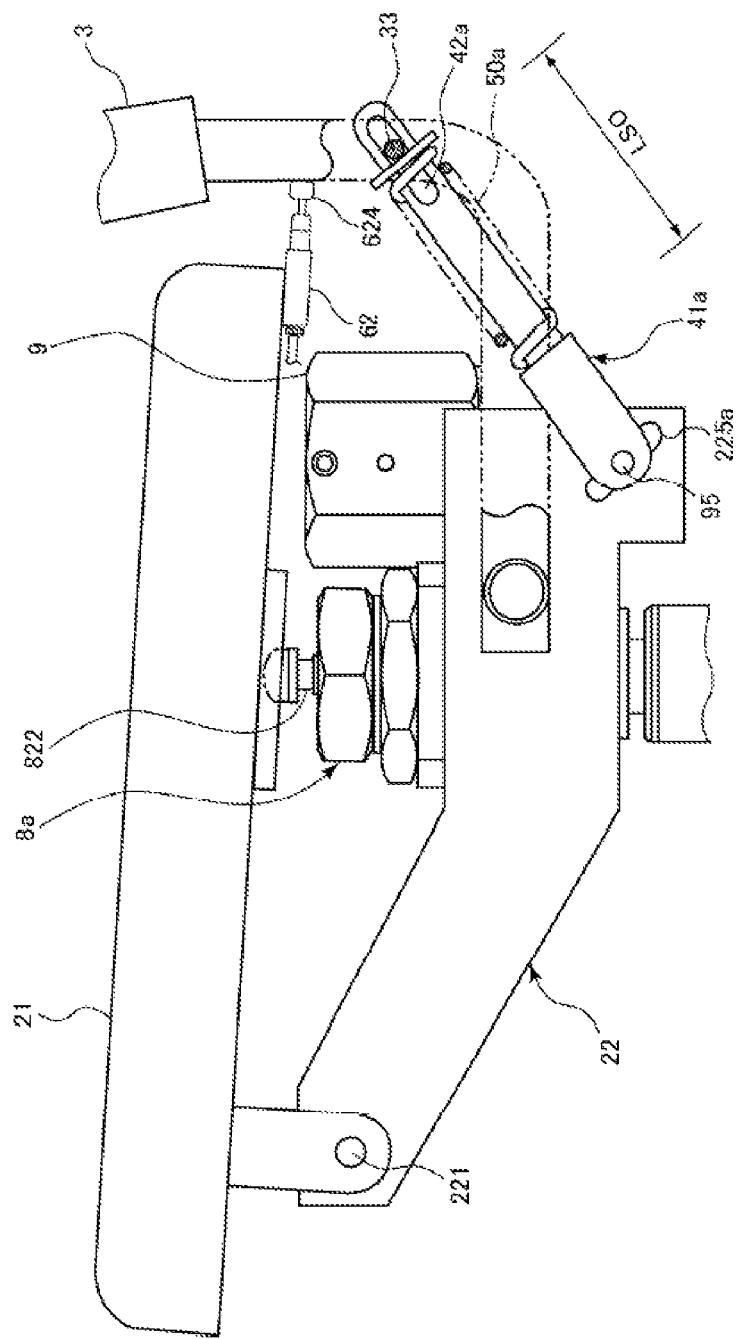
FIG. 8 is a side view of the holding force adjusting apparatus of the present invention in standby state with an object (light weight) placed thereon.

When an object is placed on the mounting platform 21, as shown in FIG. 8, the mounting platform 21 is inclined around the hinge 221, and the piston rod 822 is pushed in by the weight of the placed object. Oil pressure is output from the pressure actuators 8a and 8b, and the piston rod 922 of the movement amount actuator 9 moves downward due to the oil pressure. Guided by long holes 225a and 225b, the moving member 95 moves in a direction to compress the spring 50a, and the length of the spring becomes LS0. With this, the spring 50a will become compressed as compared to the standby state of the initial state (LS0<L0), and the biasing force applied to the supporting member 3 in the standby state increases. This biasing force is determined by the amount of compression Δ (amount of displacement)=L0−LS0 of the spring in the standby state.

Figure 7:
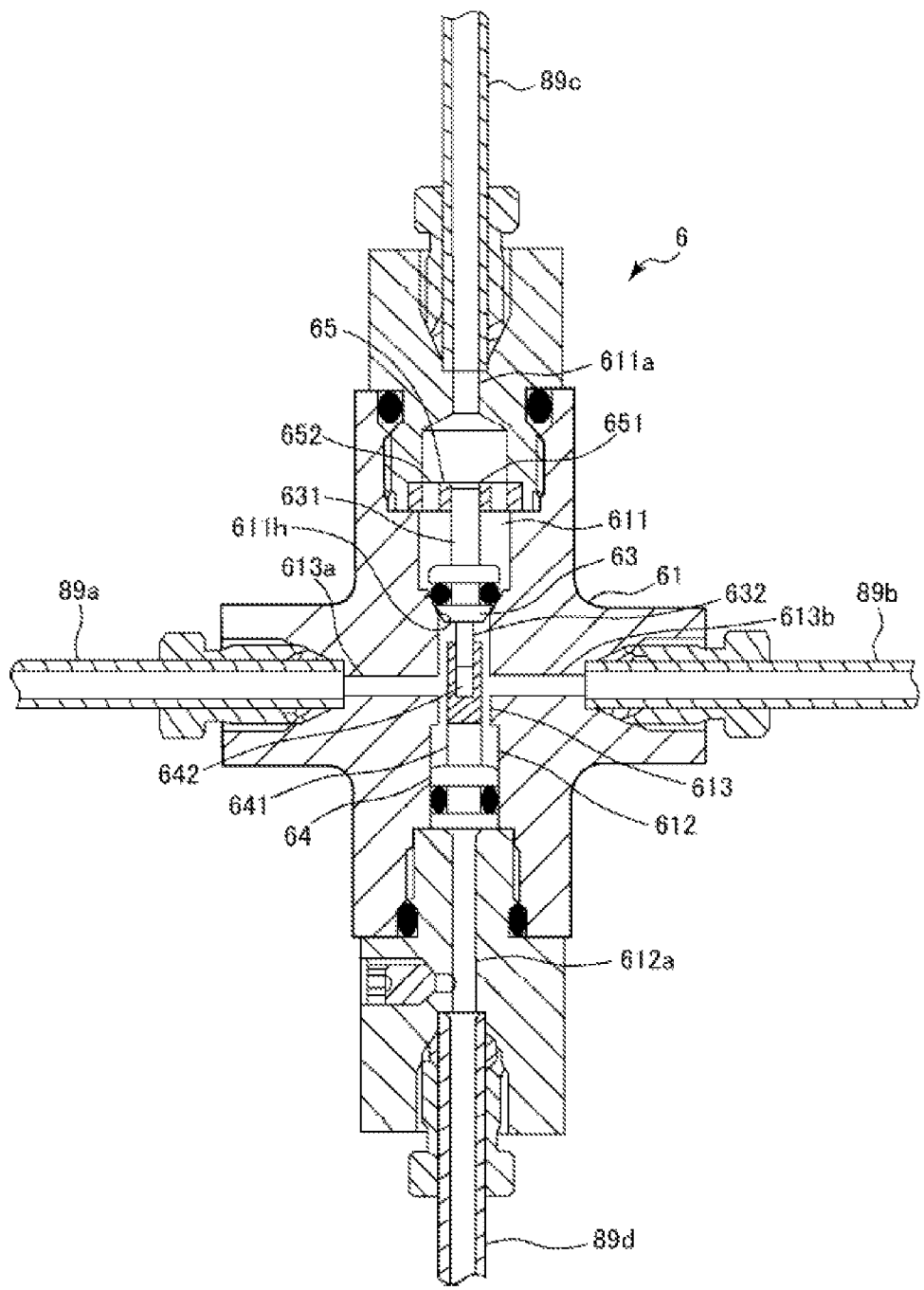
FIG. 7 is an overall cross-sectional side view of disabling reverse transmission member (restricted state).
Figure 9:
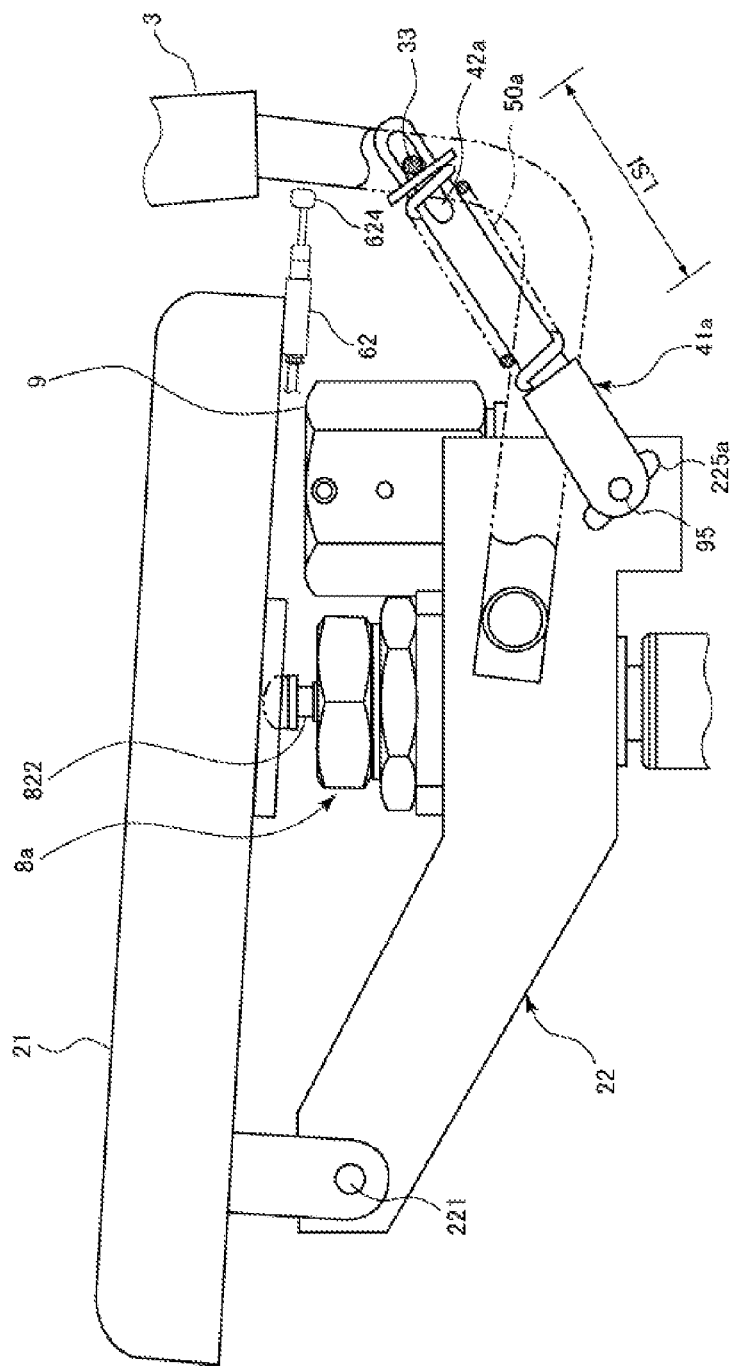
FIG. 9 is a side view of the holding force adjusting apparatus of the present invention when inclined (acting state) with an object (light weight) placed thereon.

If load is applied in a direction of inclining the supporting member 3 while in this state, as shown in FIG. 9, the supporting member 3 swings in the direction of the inclination, the connecting member 33 approaches the moving member 95, and as a result the spring 50a is further compressed (LS1<LS0). The restoring force (biasing force) of the supporting member 3 at this time becomes larger compared to the restoring force in the initial state, and increases in accordance with the inclination angle. Further, by swinging in the inclining direction of the supporting member 3, the swing member 32b moves in a direction away from the cylinder body 62. Accordingly, the piston rod 623 of the input side piston 622 is withdrawn, and as shown in FIG. 7, the piston rod 641 of the output side piston 64 will move away from the valve body 63 of the disabling reverse transmission member 6.

Due to the compression of the spring 50a caused by the inclination of the supporting member 3, the reaction force against the moving member 95 from the spring 50a is increased, and since the force in the direction of pushing in the piston rod 922 of the movement amount actuator 9 is increased, and the pressure in the movement amount actuator 9 increases. When the pressure inside the movement amount actuator 9 becomes greater than the pressure inside the pressure actuators 8a and 8b because of such phenomenon, the valve port 611h is closed by the valve body 63 of the disabling reverse transmission member 6, and therefore, the amount of displacement of the spring 50a does not change because there is no pushing of the piston rod 922 of the movement amount actuator 9, and the restoring force to the supporting member 3 will be maintained in accordance with the load.

Further, when the supporting member 3 returns to the standby state, the piston rod 623 of the input side piston 622 is pushed in by the swing member 32b, and this causes the valve body 63 of the disabling reverse transmission member 6 to move away from the valve port 611h, and therefore, movement of the piston rod 922 of the movement amount actuator 9 becomes possible, and it is possible to easily return to the initial state.

Figure 10:
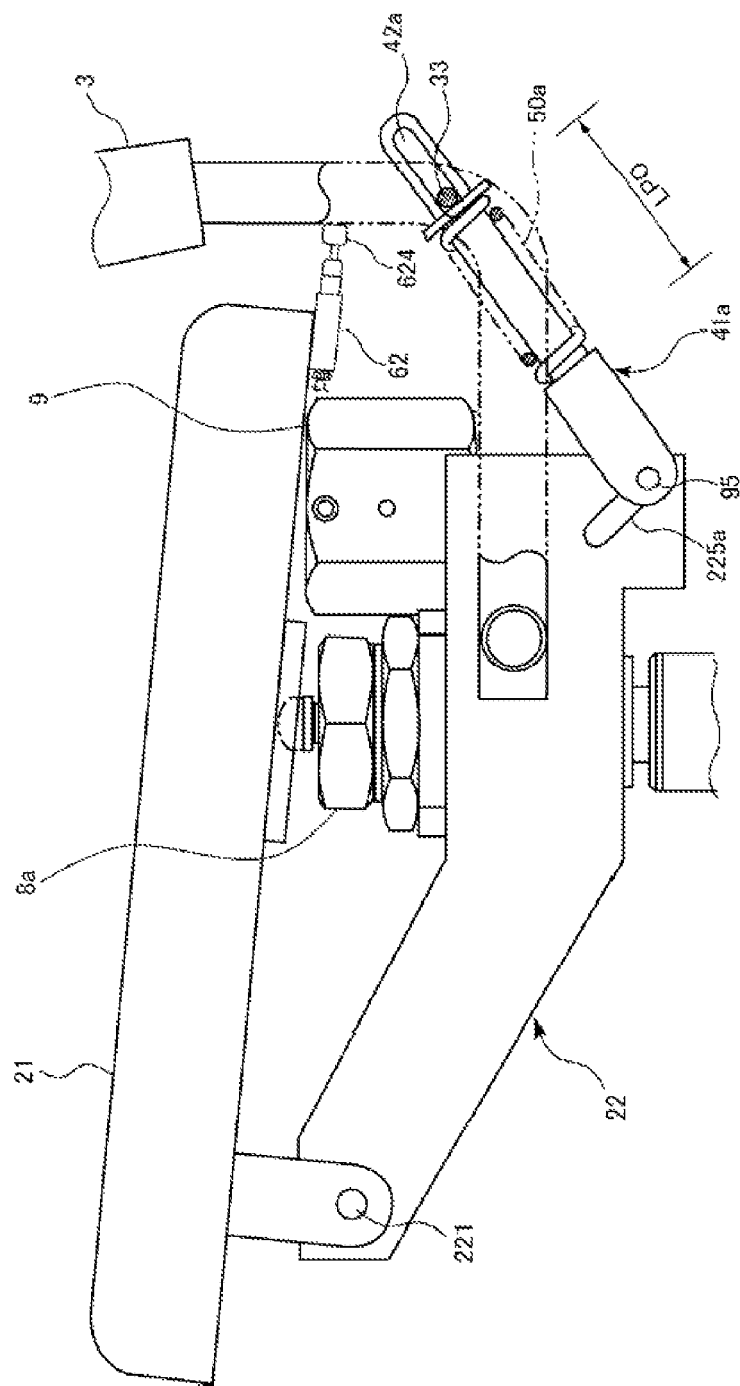
FIG. 10 is a side view of the holding force adjusting apparatus of the present invention in standby state with an object (heavy weight) placed thereon.

When an object with a larger load is placed on the mounting platform 21, the piston rod 822 is pushed in further, as shown in FIG. 10, because of the weight of the placed object as compared to the state when a lightweight object is placed (FIG. 8). Finally, the moving member 95, which has been guided to the lower end of the long holes 225a and 225b, moves in a direction to further compress the spring 50a, and the length of the spring becomes LP0. With this, spring 50a is further compressed (LP0<LS0<L0) as compared to the standby state of the initial state, and the biasing force applied to the supporting member 3 in the standby state further increases. This biasing force is determined by the amount of compression $\Delta$ (amount of displacement)=L0−LS0 of the spring in the standby state.

Figure 11:
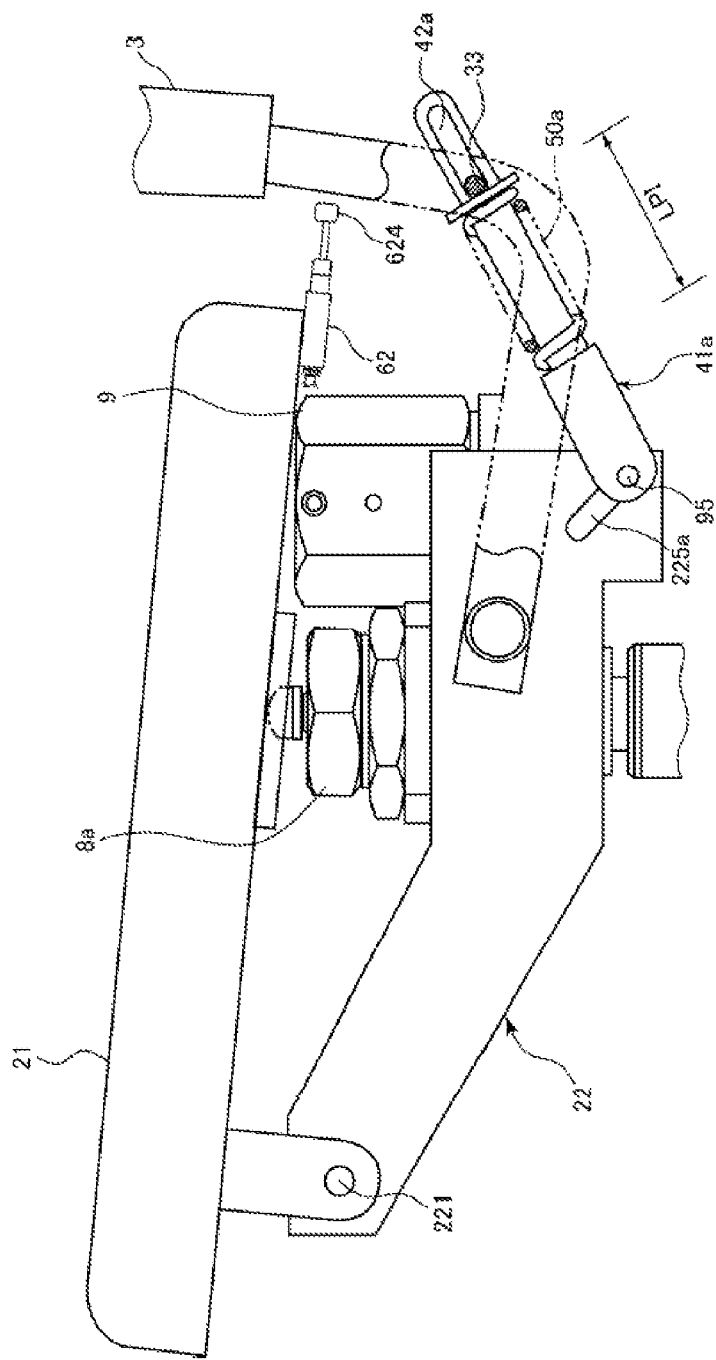
FIG. 11 is a side view of the holding force adjusting apparatus of the present invention when inclined (acting state) with an object (heavy weight) placed thereon.

If a load is applied in a direction of inclining the supporting member 3 while in this state, as shown in FIG. 11, the supporting member 3 swings in the direction of the inclination, the connecting member 33 approaches the moving member 95, and as a result the spring 50a is further compressed (LS1<LS0). The restoring force (biasing force) of the support member 3 at this time becomes larger compared to the restoring force in the initial state, and increases in accordance with the inclination angle.

In the posture holding apparatus for holding a placed object according to the present invention, although the holding force exerted by the supporting member 3 is imparted by the biasing force of the spring 50a, such a biasing force is determined by the total displacement amount ($\Delta 0+\Delta n$) obtained by adding the deformed displacement amount $\Delta n$ when the supporting member 3 is inclined to the displacement amount $\Delta 0$ of standby state. Further, it is configured such that, when an object is placed on the base, the total displacement amount is varied (increased) by varying (increasing) the amount of displacement $\Delta 0$ in the standby state, i.e. by making the displacement amount $\Delta 0$ vary (increase) in standby state, and the holding force of the supporting member 3 is eventually varied (increased) according to the weight.

As described above, the posture holding apparatus for holding a placed object according to the present invention is provided with a configuration in which, the restoring force from a supporting member changes in accordance with the weight of the placed object, and the biasing force (restoring force) from the supporting member increases as the weight of the placed object increases. That is, the posture holding apparatus for holding a placed object according to the present invention can fully realize posture-retaining force to push back the inclined placed object to original state while maintaining appropriate shock absorbing action for the inclined object, and the posture holding apparatus of the present invention accommodates objects having a wide range of loads from lightweight to heavy weight.

In addition to the configuration explained above, the springs 50a and 50b are not limited to compressible springs, and it is also possible to use a tension spring, or a torsion spring wound around the oscillating shaft 31.

Moreover, the object placed on the mounting platform 21 can be anything, but the present invention is particularly useful for a case in which the center of gravity of the placed object shifts in the placed state, and proper support from a supporting member becomes necessary. The examples of these can be humans, animals, or a container containing liquid or the like.

As shown in FIG. 12, when a human sits on the mounting platform 21 of the posture holding apparatus, the hip region and the back are respectively supported as the hip region leans from the top of the mounting platform 21 and the back Hmb of the body reclines onto the support member 3 from the front side. Then, depending on the difference in the body weight of the human that is transmitted from the hip region to the mounting table 21, the pressure actuator 8 and movement amount actuator 9 feed various displacement amount to the bias force adjust member 5 through the above mechanism. Consequently, the initial compression amount of the spring 50, i.e. the biasing force to push back the supporting member 3 to the initial position, changes by the action of the bias force adjust member 5.

Therefore, the human sitting on the posture holding apparatus receives the reaction force applied to the back Hmb of the body via the supporting member 3 as a value that is appropriate for each body weight. Thereby, when a supporting member 3 is inclined from the initial position to the rear side by changing the posture (shown in FIG. 12 by imaginary line), there is no chance that the supporting member 3 will be too heavy, or contrarily, too light. Further, even in case a supporting member 3 is maintained at a certain angle in the reclined state, because the supporting member 3 is pushed back so that the back (of the body) is pushed back, and the posture will not be imbalanced. Moreover, because the biasing force to push back the supporting member 3 to the initial position is adjusted as appropriate when the hip part of human rests on the mounting platform 21, it is not necessary to separately provide a manual adjusting means having a complicated mechanism.

What is claimed is:

1. A holding force adjusting apparatus for adjusting a holding force of a posture holding apparatus, the holding force adjusting apparatus comprising:
   said posture holding apparatus coupled to the holding force adjusting apparatus, the posture holding apparatus comprising:
      a base onto which a substance is to be placed,
      a supporting member which is coupled to the base so that the supporting member freely swings between a standby state where the supporting member does not support the substance and an active state where the supporting member supports the substance in an inclination state, the supporting member being positioned on a side of the base, and
      a swinging support member having a bias force for returning the supporting member to the standby state when the supporting member is inclined, the holding force adjusting apparatus further comprising:
   a weight detection member for detecting a weight of the substance placed on the base; and
   a returning force adjusting member for adjusting the bias force of the swinging support member according to the weight detected by the weight detection member, wherein the returning force adjusting member moves an end portion of the swinging support member in a direction oblique to a horizontal direction to adjust the bias force of the swinging support member.

2. A holding force adjusting apparatus for adjusting a holding force of a posture holding apparatus, the holding force adjusting apparatus comprising:
   said posture holding apparatus coupled to the holding force adjusting apparatus, the posture holding apparatus comprising:

a base onto which a substance is to be placed, a supporting member which is coupled to the base so that the supporting member freely swings between a standby state where the supporting member does not support the substance and an active state where the supporting member supports the substance in an inclination state, the supporting member being positioned on a side of the base, a swinging support member having a bias force for returning the supporting member to the standby state when the supporting member is inclined, and an elastic member for providing the bias force to the swinging support member in response to an inclination amount of the supporting member; the holding force adjusting apparatus further comprising:

a liquid pressure output member for outputting a pressure transmission medium in response to a weight of the substance placed on the base, the liquid pressure output member being positioned under the base;

a bias force adjusting member for adjusting the bias force of the elastic member according to a liquid pressure of the pressure transmission medium outputted from the liquid pressure output member; and a reverse transmission prevention member for preventing a reverse transmission of the pressure transmission medium from the bias force adjusting member to the liquid pressure output member when the supporting member is inclined and for allowing the reverse transmission of the pressure transmission medium when the supporting member is in the standby state.

3. The holding force adjusting apparatus of claim 2, wherein the pressure transmission medium is outputted by shrinking a capacity of a storage room for storing the pressure transmission medium according to the weight of the substance placed on the base.

4. The holding force adjusting apparatus of claim 2 further comprising:

an adjusting member designed to adjust a displacement amount of the elastic member in the standby state, wherein the bias force adjusting member moves the adjusting member back and forth according to the liquid pressure of the pressure transmission medium outputted from the liquid pressure output member to adjust the displacement amount of the elastic member in the standby state.

5. The holding force adjusting apparatus of claim 2 further comprising:

a pressure transmitting member comprising a path of the pressure transmission medium from the liquid pressure output member to the bias force adjusting member;

wherein the reverse transmission prevention member is provided on the path of the pressure transmitting member.

6. The holding force adjusting apparatus of claim 2, further comprising:

a release member for releasing the pressure transmission medium to the reverse transmission prevention member to arrange the reverse transmission prevention member to allow the reverse transmission of the pressure transmission medium when the supporting member returns to the standby state.

7. The holding force adjusting apparatus of claim 1, wherein the other end portion of the swinging support member is coupled to the supporting member through a connecting member, and wherein the swinging support member rotates around the connecting member when the returning force adjusting member moves the end portion of the swinging support member.

8. The holding force adjusting apparatus of claim 1, further comprising an aperture whose contour orients in the direction oblique to the horizontal direction;

wherein the returning force adjusting member moves the end portion of the swinging support member so that the end portion of the swinging support member slides along the contour of the aperture.

\* \* \* \* \*